(12) United States Patent
Neumann et al.

(10) Patent No.: US 8,462,881 B2
(45) Date of Patent: Jun. 11, 2013

(54) METHOD FOR DIGITALLY PREDISTORTING A PAYLOAD SIGNAL AND RADIO STATION INCORPORATING THE METHOD

(75) Inventors: Dirk Neumann, Ulm (DE); Peter Kenington, Chepstow (GB)

(73) Assignee: Ubidyne, Inc., Wilmington, DE (US)

( * ) Notice: Subject to any disclaimer, the term of this patent is extended or adjusted under 35 U.S.C. 154(b) by 536 days.

(21) Appl. No.: 12/648,028

(22) Filed: Dec. 28, 2009

(65) Prior Publication Data

US 2010/0166110 A1 Jul. 1, 2010

Related U.S. Application Data (60) Provisional application No. 61/141,905, filed on Dec. 31, 2008.

(51) Int. Cl.
 H04K 1/02 (2006.01)
 H04L 25/03 (2006.01)
 H04L 25/49 (2006.01)

(52) U.S. Cl.
 USPC ............................................ 375/296; 375/295

(58) Field of Classification Search
 USPC ................................................... 375/296, 295
 See application file for complete search history.

(56) References Cited

U.S. PATENT DOCUMENTS

| | | | |
|---|---|---|---|
| 5,852,630 A | 12/1998 | Langberg et al. | |
| 6,292,135 B1 | 9/2001 | Takatori et al. | |
| 6,934,341 B2 | 8/2005 | Sahlman | |
| 6,943,627 B2 | 9/2005 | Leyonhjelm et al. | |
| 6,944,188 B2 | 9/2005 | Sinha et al. | |
| 7,483,450 B1 | 1/2009 | Giese et al. | |
| 7,558,348 B1 | 7/2009 | Liu et al. | |
| 8,064,850 B2 | 11/2011 | Yang et al. | |
| 2002/0181611 A1 | 12/2002 | Kim | |
| 2003/0058960 A1 | 3/2003 | Lee | |
| 2004/0151506 A1 | 8/2004 | Shiramizu et al. | |
| 2004/0246048 A1* | 12/2004 | Leyonhjelm et al. | 330/2 |
| 2005/0047495 A1 | 3/2005 | Yoshioka | |
| 2005/0110565 A1 | 5/2005 | Robinson | |

(Continued)

FOREIGN PATENT DOCUMENTS

| | | |
|---|---|---|
| WO | 2010/092076 | 8/2010 |
| WO | 2010/092082 | 8/2010 |

OTHER PUBLICATIONS

WiBE Reinventing Broadband web page, http://www.deltenna.com/products/wibe.aspx, published before Dec. 2009.

*Primary Examiner* — Shuwang Liu
*Assistant Examiner* — Nader Bolourchi
(74) *Attorney, Agent, or Firm* — Stephen H. Eland; Dann, Dorfman, Herrell & Skillman (57) ABSTRACT

A radio station providing a digital predistortion to be imposed on a payload signal is disclosed. The digital predistortion is usable as a digital predistortion for one or more of the transmit paths of the radio station. The radio station provides coupled transmit signals to be switched as a selected one of the coupled transmit signals along a common feedback path. A digital predistortion update unit is adapted to update the digital predistortions in order to linearise a transfer characteristics of the transmit paths according to a hierarchy of the transmit paths. A method of digitally predistorting a payload signal in order to linearise a transmit characteristics of the transmit paths is disclosed.

39 Claims, 5 Drawing Sheets

U.S. PATENT DOCUMENTS

| | | |
|---|---|---|
| 2005/0180527 A1 | 8/2005 | Suzuki et al. |
| 2006/0105715 A1 | 5/2006 | Kodani et al. |
| 2006/0133535 A1 | 6/2006 | Jung et al. |
| 2006/0286940 A1 | 12/2006 | Izumi et al. |
| 2008/0007453 A1 | 1/2008 | Vassilakis et al. |
| 2008/0143562 A1* | 6/2008 | Huang et al. .................. 341/118 |
| 2008/0232492 A1 | 9/2008 | Xiao et al. |
| 2009/0184763 A1 | 7/2009 | Kim |
| 2010/0093282 A1 | 4/2010 | Martikkala et al. |
| 2011/0235734 A1 | 9/2011 | Kenington |
| 2011/0235749 A1 | 9/2011 | Kenington |
| 2012/0020392 A1* | 1/2012 | O'Keeffe et al. ............. 375/221 |
| 2012/0027066 A1* | 2/2012 | O'Keeffe ...................... 375/224 |

* cited by examiner

METHOD FOR DIGITALLY PREDISTORTING A PAYLOAD SIGNAL AND RADIO STATION INCORPORATING THE METHOD

CROSS REFERENCE TO OTHER APPLICATIONS

This application claims the benefit of U.S. Provisional Application No. 61/141,905, filed on Dec. 31, 2008. The entire disclosure of the foregoing application is incorporated herein by reference. This application is further related to U.S. patent application Ser. No 12/648,000 entitled "A radio station and active antenna array" filed concurrently herewith and claiming the benefit of U.S. Provisional Application No. 61/141,883, filed on Dec. 31, 2008. The entire disclosure of the foregoing application is incorporated herein by reference.

FIELD OF THE INVENTION

This disclosure relates to a radio station incorporating a digital predistortion of a payload signal. In particular the radio station is embedded within the antenna array. The disclosure further relates to a method for digitally predistorting a payload signal. The disclosure also relates to a computer program product for the manufacture of the radio station; and a computer program product for carrying out the method of digitally predistorting the payload signal. The further relates to an antenna array comprising the radio station according to the present invention.

BACKGROUND OF THE INVENTION

With the increasing use of mobile communication systems, system operators of mobile communication systems need more transmitters, such as radio stations typically being part of base stations, in order to meet the increased demand for telecommunication. Increasing the number of the base stations is expensive for the system operator. For example, maintenance of the base stations, i.e. the radio stations, may require an engineer to be present at the site of the base station. The increased number of the base stations could therefore require an increased number of service engineers to serve the increased number of the base stations. There are code sharing (Code Division Multiple Access CDMA) and time division (Time Division Multiple Access TDMA) strategies to increase the amount of customers served by an individual one of the base stations.

Nowadays antenna arrays are used in the field of mobile communications systems in order to reduce power transmitted to a handset of a customer and thereby increase the efficiency of the base station, i.e. the radio station. The radio station typically comprises a plurality of antenna elements, i.e. an antenna array adapted for transceiving a payload signal. Typically the radio station comprises a plurality of transmit paths, each of the transmit paths being terminated by one of the antenna elements. The plurality of the antenna elements used in the radio station typically allows steering of a beam transmitted by the antenna array. The steering of the beam includes but is not limited to at least one of: detection of direction of arrival (DOA), beam forming, down tilting and beam diversity. These techniques of beam steering are well-known in the art.

The code sharing and time division strategies as well as the beam steering rely on the radio station and the antenna array to transmit and receive within well defined limits set by communication standards. The communications standards typically provide a plurality of channels or frequency bands useable for an uplink communication from the handset to the radio station as well as for a downlink communication from the radio station to the handset. For the radio station to comply with the communication standards it is of interest to reduce so called out of band emissions, i.e. transmission out of a communication frequency band or channel as defined by the communication standards.

For the transmission of the payload signal the base station comprises an amplifier within the transmit paths of the radio station. Typically, each one of the transmit paths comprises an individual one of the amplifiers. The amplifier typically introduces nonlinearities into the transmit paths. The nonlinearities introduced by the amplifier affect a transfer characteristic of the transmit paths. The nonlinearities introduced by the amplifier distort the payload signal relayed by the radio station as a transmit signal along the transmit paths.

The term "transfer characteristics" of a device, such as the amplifier can be construed as follows: Suppose the device has an input port for accepting an input signal and an output port to yield an output signal in response to the input signal. Such a device is referred to as a two-port device if there is only one input port and one output port. The transfer characteristics may likewise be defined for devices comprising a plurality of input ports and/or a plurality of output ports. The transfer characteristics of the device describe how the input signal(s) yield the output signal. It is known in the art that the transfer characteristics of a nonlinear device, for example a diode or the amplifier generally comprise a nonlinearity.

The concept of predistortion or digital predistortion uses the output signal of the device, for example from the amplifier, for correcting the nonlinear transfer characteristics. The output signal is compared to the input signal by means of a feedback and from this comparison an "inverse distortion" is added and/or multiplied to the input signal in order to linearise the transfer characteristics of the device. The nonlinear transfer characteristics of the amplifier can be corrected by carefully adjusting the predistortion.

To apply the predistortion to the amplifier it is of interest to know the distortions or nonlinearities introduced by the amplifier. This is commonly achieved by the feedback of the transmit signal to a predistortion module. The predistortion module is adapted to compare the transmitted signal with a signal prior to amplification in order to determine the distortions introduced by the amplifier. The signal prior to amplification is for example the payload signal.

The concept of the predistortion has been explained in terms of correcting the transfer characteristics with respect of the amplitude. It is understood that predistortion may alternatively and/or additionally correct for nonlinearities with respect to a phase of the input signal and the output signal.

The nonlinearities of the transfer characteristics of the transmit path are typically dominated by the nonlinearities in the transfer characteristics of the amplifier. It is often sufficient to correct for the nonlinearities of the amplifier.

PRIOR ART

U.S. Pat. No. 6,943,627 B2, to Ericsson, provides a robust and non-invasive calibration of an adaptive signal conditioning system comprising a signal conditioning block in the signal path, a transmit path and a common feedback path. The Ericsson patent further discloses a reference signal in order to calibrate the feedback path prior to determining a required predistortion in order to linearise a transfer characteristic of the transmit path. The Ericsson patent provides a common feedback path for the digital predistortion and an individual digital predistortion for each one of the transmit paths.

BRIEF SUMMARY OF THE INVENTION

The present disclosure teaches a radio station which comprises a digital predistortion module, at least one transmit path, an RF amplifier, a switch, a common feedback path and a digital predistortion update module. The digital predistortion module is adapted to impose at least one digital predistortion onto a payload signal thus forming at least one predistorted payload signal. The transmit path is adapted to relay the predistorted payload signal as the transmit signal. The RF amplifier is adapted to amplify the predistorted payload signal as a transmit signal. The payload signal is typically in the form of pairs of in phase and quadrature data (I, Q). The transmit path is terminated by an antenna element. The coupler is adapted to extract a coupled transmit signal out of the transmit signal. The switch is adapted to forward a selected one of the coupled transmit signals into a common feedback path. The switch typically comprises N input ports, wherein N corresponds to the number of transmit paths. The selected one of the coupled transmit signals travels along the common feedback path and reaches the digital predistortion update module. The digital predistortion update module is adapted to update at least one of the digital predistortions imposed on the payload signal, in order to linearise a transfer characteristics of at least one of the transmit paths according to a hierarchy of the transmit paths.

The radio station of the disclosure teaches at least one digital predistortion which is used for at least one of the transmit paths. This allows an updating of the digital predistortions in order to linearise all or some of the transmit paths of the radio station.

The radio station of the disclosure allows for the linearising of the transfer characteristics of the transmit paths according to the hierarchy of the transmit paths of the radio station. The hierarchy of the transmit path shall be construed as an order of the transmit paths according to a hierarchy criterion. According to the hierarchy criterion the transmit paths are given a position or a ranking within the hierarchical order of the transmit paths. More than one of the transmit paths may be given an identical ranking within the hierarchy of the transmit paths. The higher the ranking of the transmit path, the sooner it will get linearised.

The hierarchy criterion may be based on at least one of: a power rating of the transmit paths, an impact of the transmit path on a beam emitted by the antenna elements, a position of the antenna elements terminating the transmit path within a geometrical arrangement of an antenna array.

The linearising of the transmit paths according to the hierarchy of the transmit paths helps to speed up the process of linearising the transfer characteristics of the transmit paths in comparison to the prior art. Furthermore, it allows the linearization processing to concentrate greatest effort (time) on the transmit paths which have the greatest impact upon the overall performance of the antenna array, for example, those which contribute the greatest output power to the overall antenna array.

The disclosure further relates to a method for digitally predistorting a payload signal. The method for digitally predistorting the payload signal comprises providing the payload signal. The method further comprises providing a hierarchy of transmit paths. The method further comprises imposing at least one digital predistortion on the payload signal forming at least one predistorted payload signal. The predistorted payload signal is to be relayed as a transmit signal along the transmit paths. The method further comprises extracting at least one coupled transmit signal out of the transmit signals. The method further comprises switching a selected one of the coupled transmit signals into a common feedback path. The method further comprises an altering of the digital predistortion from the selected one of the coupled transmit signals; thereby linearising a transfer characteristics of the at least one transmit path.

The disclosure further relates to a computer program product embodied on a computer-readable medium. The computer program product comprises executable instructions for the manufacture of the radio station according the teachings disclosed herein. The disclosure further teaches a computer program product comprising instructions that enable a processor to carry out the method for digitally predistorting a payload signal according to the teachings disclosed herein.

The disclosure further relates to an antenna array comprising a radio station according to the teachings disclosed herein and a signal conditioner. The transmit paths of the radio station comprise an adjustable phase and magnitude between individual ones of the antenna elements. The signal conditioner is adapted to impose phase and amplitude differences between the antenna elements.

The disclosure further relates to a chipset implementing the radio station.

DETAILED DESCRIPTION OF THE INVENTION

For a better understanding of the present disclosure reference shall now be made to the aspects of the present invention, examples of which are illustrated in the accompanying drawings.

It shall further be understood that the drawings are not to be construed in a limiting way. The scope of protection is defined by the claims as part of this application. For a person skilled in the art it is obvious that several aspects of the following description may as well be combined.

Figure 1:
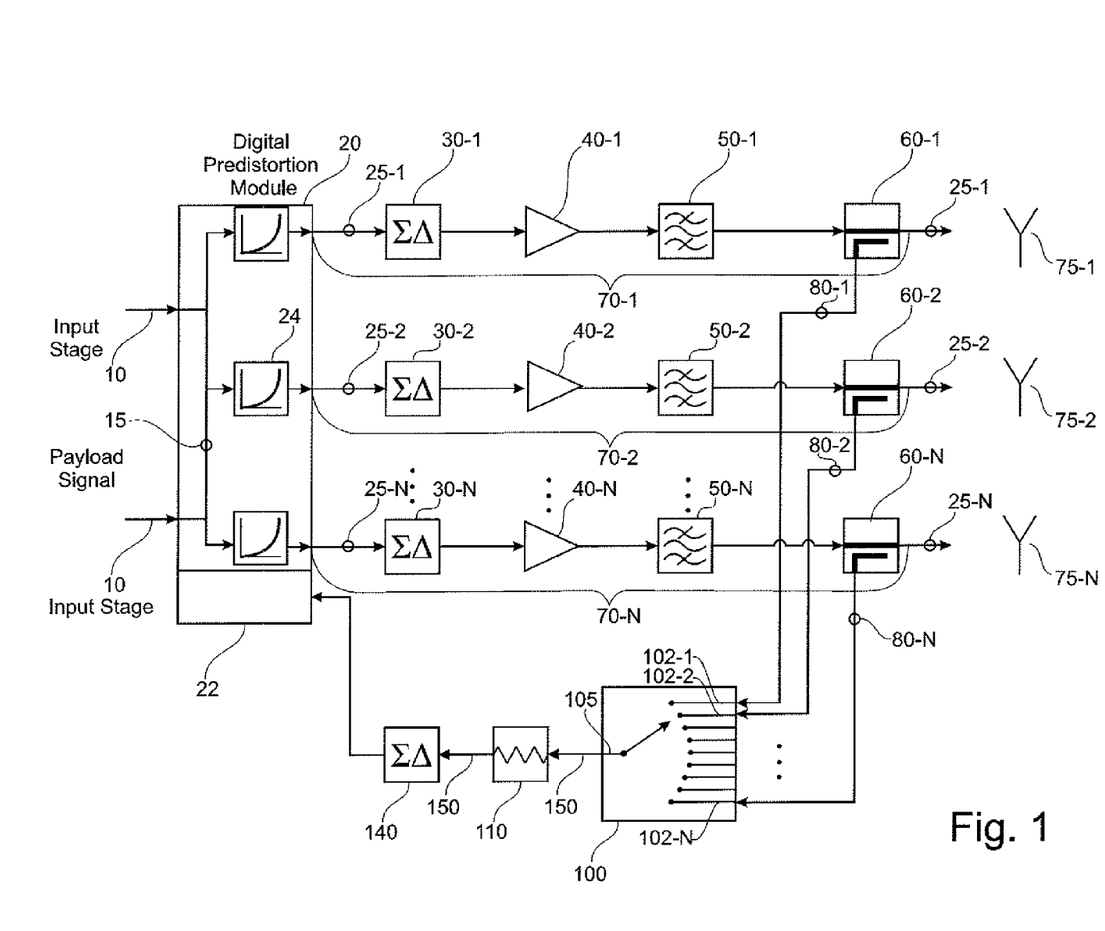
FIG. 1 shows a first aspect of a radio station according to the present disclosure.

FIG. 1 shows a first aspect of a radio station 1 according to the present disclosure. An input stage 10 is adapted to accept a payload signal 15. The payload signal 15 is forwarded to a digital predistortion module 20. The digital predistortion module 20 is adapted to impose at least one digital predistortion 24-1, 24-2, . . . , 24-N onto the payload signal 15 thus forming the predistorted payload signal 25-1, 25-2, . . . , 25-N. There are three digital predistortions 24-1, . . . , 24-N and three predistorted payload signals 25-1, . . . , 25-N shown in FIG. 1. Any other number of the digital predistortions 24-1, . . . , 24-N and/or predistorted payload signals 25-1, . . . , 25-N is conceivable. The predistorted payload signals 25-1, . . . , 25-N are to be relayed along the transmit paths 70-1, . . . , 70-N as transmit signals 90-1, . . . , 90-N.

The digital predistortion module 20 may be implemented as a digital signal processor (DSP). The payload signal 15 typically comprises an in phase portion and an out of phase portion, i.e. a quadrature portion (I, Q). The input data 15 may be provided in a digital format. The digital formats for the payload signal 15 in an (I, Q) format are known in the art and will not be explained any further. Alternatively or additionally it is possible for the input signal 15 to be provided as pairs of amplitude and phase values (A, P). The payload signal 15 is not changed by the selected form of the payload signal 15 i.e. (I,Q) or pairs of phase and amplitude (A, P).

The radio station 1 as shown in FIG. 1 comprises at least one transmit path 70-1, 70-2, . . . , 70-N. There are three different transmit paths 70-1, 70-2, 70-N displayed within FIG. 1. Obviously, different numbers of the transmit paths 70-1, . . . , 70-N are conceivable. Each one of the transmit paths 70-1, . . . , 70-N is terminated by an antenna element 75-1, 75-2, . . . , 75-N. In FIG. 1 the digital predistortions 24-1, . . . , 24-N are provided for the transmit paths 70-1, . . . , 70-N. It is of interest to provide one of the digital predistortions 24-1, . . . , 24-N for each one of the transmit paths 70-1, . . . , 70-N. One of the digital predistortions 24-1, . . . , 24-N allows for individually linearising each one of the transmit paths 70-1, . . . , 70-N. It is conceivable to provide one of the digital predistortions 24-1, . . . , 24-N for more than one of the transmit paths 70-1, . . . , 70-N. It may be of interest to provide the one of the digital predistortions 24-1, . . . , 24-N to more than one of the transmit paths 70-1, . . . , 70-N in order to speed up a process of linearising the transmit paths 70-1, . . . , 70-N. This is conceivable if a substantially identical behaviour of the more than one transmit paths 70-1, . . . , 70-N can be assumed.

The antenna elements 75-1, . . . , 75-N terminating the transmit paths 70-1, . . . , 70-N are not critical for the digital predistortion 24-1, . . . , 24-N to be imposed on the payload signal 15 to form the predistorted payload signal 25-1, . . . , 25-N being relayed as a transmit signal 90-1, 90-2, . . . , 90-N along the transmit paths 70-1, . . . , 70-N. Hence, the antenna elements 75-1, . . . , 75-N are only shown in FIG. 1.

Figure 3:
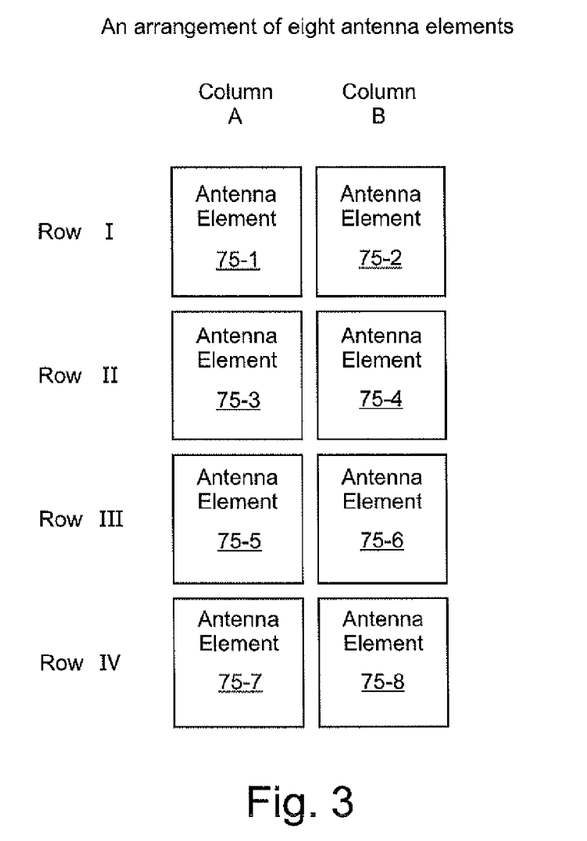
FIG. 3 shows an example of eight antenna elements arranged in two columns (A and B) and four rows (I, II, III and IV).
Figure 5:
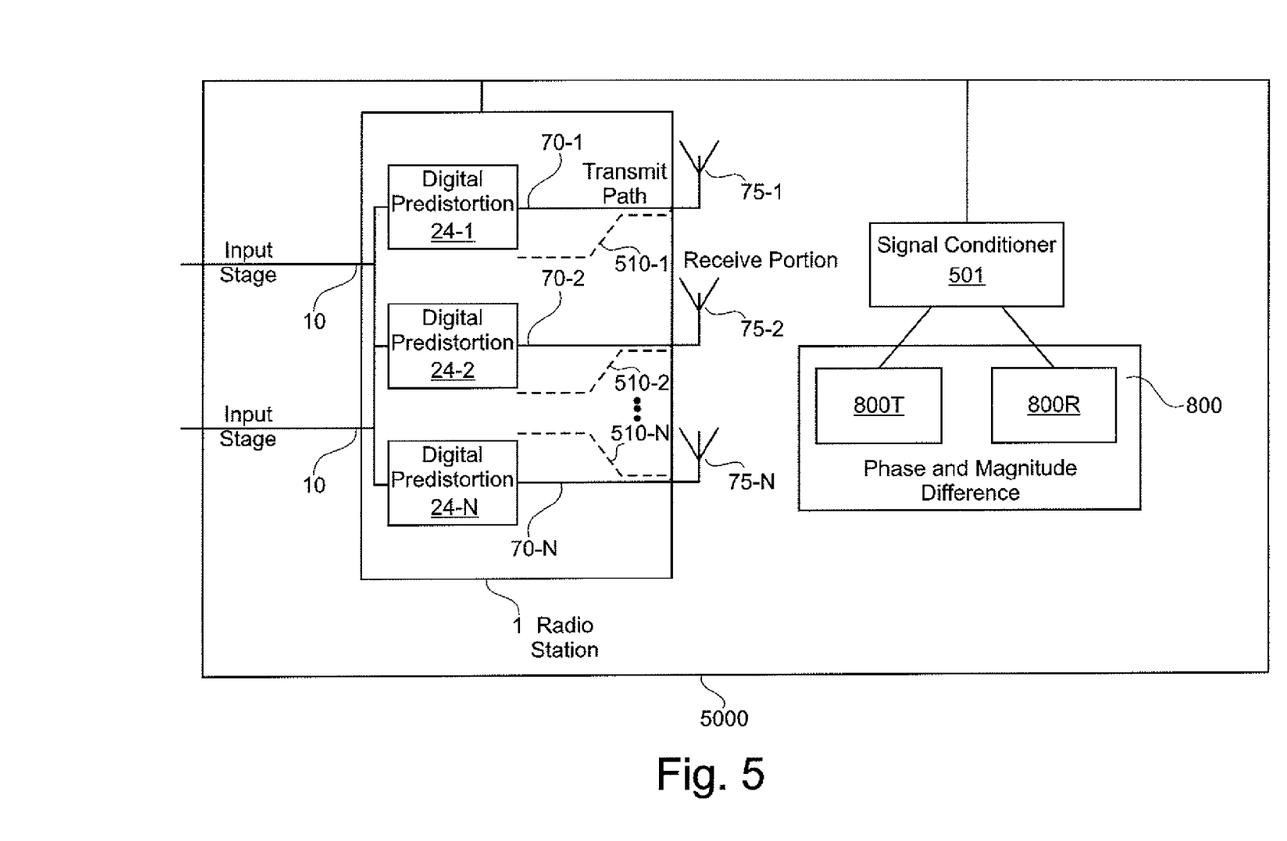
FIG. 5 shows a block diagram of the antenna array according to the present disclosure.

The radio station 1 is adapted to relay radio signals. The radio signals can be in the form of the payload signal 15 and/or the predistorted payload signal 25-1, ..., 25-N. The payload signal 15 and/or the predistorted payload signal 25-1, ..., 25-N are to be relayed along the transmit paths 70-1, ..., 70-N of the radio station 1. The radio station 1 typically is further adapted to receive a receive signal. As predistortion deals with nonlinearities in a transfer characteristics of the transmit paths 70-1, ..., 70-N, the receive portion of the radio station 1 is shown in FIG. 5 only, but not within Fiq. 3.

The radio station 1 adapted to transmit and receive signals may further comprise two different sets of antenna elements. A first set of the two sets of the antenna elements being used as the antenna elements 75-1, . . . , 75-N terminating the transmit paths 70-1, . . . , 70-N. A second set of the antenna elements is used for reception of a receive signal. The second set of the antenna elements may be exclusively used for the reception of the receive signal. Alternatively, it is possible to use the antenna elements 75-1, . . . , 75-N terminating the transmit paths 70-1, . . . , 70-N for both the transmission and the reception of the radio signals. Alternatively, antenna elements 75-1, . . . , 75-N can also represent antenna sub-arrays instead of single elements. For example, a two-element sub-array for each transmit path might be interesting for overall cost.

For the radio station 1 comprising one set of the antenna elements 75-1, . . . , 75-N used for both, transmission and reception, the transmit path 70-1, . . . , 70-N would be in the form of a transceiver path. The transceiver path comprises a transmit portion of the transceiver path and a receive portion of the transceiver path. The transmit portion corresponds to the transmit path 70-1, . . . , 70-N as shown within FIG. 1. The receive portion of the transceiver path typically branches out from a separation device (not shown), for example a circulator or an appropriate filter and the like, as known in the art. The separation device directs received signals from the antenna elements 75-1, . . . , 75-N to the receive portion 510-1, 510-2, . . . , 510-N (see FIG. 5) of the transceiver path. The transmit signal 90-1, . . . , 90-N travelling along the transmit portion of the transceiver path, i.e. the transmit path 70-1, . . . , 70-N, are directed towards the antenna elements 75-1, . . . , 75-N for transmission.

It will be apparent for a person skilled in the art that the concept described for the transmit paths 70-1, . . . , 70-N also holds true in the case of the transmit portion of the transceiver paths; in those cases in which the radio station 1 is used for transmission and reception of the radio signals.

The transmit path 70-1, . . . , 70-N, as shown in FIG. 1, comprises a digital-to-analogue converter in the form of a delta-sigma digital-to-analogue converter 30-1, 30-2, . . . , 30-N.

It is possible for the radio station 1, as described herein, to be implemented on a single chip. The limiting dimensions of the radio station 1 are substantially determined by dimensions of the antenna elements 75-1, . . . , 75-N, i.e. the dimensions of an antenna array 5000, as described below when implementing the radio station 1 on a single chip.

The implementing of the radio station 1 on the single chip may substantially reduce the hardware costs for the radio station 1, as no further space is needed separated from the antenna elements to house RF equipment. The RF equipment comprises for example an RF amplifier needing space and cooling power. The implementation of the radio station 1 on a chip further omits difficulties introduced by cable connections from a base portion of the radio station 1 to a top portion of the radio station 1 where the antenna elements 75-1, . . . , 75-N are located. It is known that phase differences occur between signals carried on some of the cable connections. The phase differences of the signals on the individual cable connections will result in a phase differences between signals transmitted by individual ones of the antenna elements 75-1, . . . , 75-N as intended in connection with the beam steering techniques.

In the prior art, the individual ones of the cable connections may require calibration in order to compensate for the phase differences introduced by the cable connections. This calibration of the cable connections is time consuming. Further, the calibration of the cable connections may change when altering the cable connections, such as replacing a selected one of the cable connections that has been damaged. The implementing of the radio station 1 on a single chip omits these difficulties introduced by the cable connections.

The transmit path 70-1, . . . , 70-N further comprises an amplifier 40-1, 40-2, . . . , 40-N as well as a filter 50-1, 50-2 . . . , 50-N and a coupler 60-1, . . . , 60-N. The transfer characteristics of the amplifiers 40-1, . . . , 40-N are typically designed to be as identical as possible for the radio station 1 comprising several transmit paths 70-1, . . . , 70-N. Typically a group of the amplifiers 40-1, . . . , 40-N is fabricated in a single batch. The use of the amplifiers 40-1, . . . , 40-N belonging to the single batch increases the likelihood of the amplifiers 40-1, . . . , 40-N having substantially identical characteristics.

The filter 50-1, . . . , 50-N may be any filter adapted to appropriately filter the transmit signal 90-1, . . . , 90-N leaving the amplifier 40-1, . . . , 40-N after an amplification of the predistorted payload signal 25-1, . . . , 25-N. In case of a combined transmit and receive path, the transmit portion of the transceiver path could branch out from the filter element 50-1, ..., 50-N, as is known in the art. Typically, the filter 50-1, ..., 50-N comprises a band pass filter. The filter 50-1, ..., 50-N allows the transmit signal 90-1, ..., 90-N to pass the filter 50-1, ..., 50-N in a group of frequency bands or channels as defined by the communication standard, such as for example 3GPP. The position of the band pass filter 50-1, ... 50-N may be before or after the coupler 60-1, ... 60-N.

The transmit path 70-1, ..., 70-N further comprises the coupler 60-1, 60-2, ..., 60-N. The coupler 60-1, ..., 60-N is adapted to extract a portion of the transmit signal 90-1, ..., 90-N as a coupled transmit signal 80-1, 80-2, ..., 80-N out of the transmit path 70-1, ..., 70-N. The coupler 60-1, ..., 60-N is known in the art and may for example comprise a circulator. Obviously any other form of coupler 60-1, ..., 60-N is appropriate for use with the present disclosure, provided the coupler 60-1, ..., 60-N allows the extraction of a coupled transmit signal 80-1, ..., 80-N out of the transmit signal 90-1, ..., 90-N. The coupled transmit signals 80-1, ..., 80-N are forwarded to a switch 100.

The switch 100 comprises a plurality of switch inputs 102-1, 102-2, ..., 102-N and one switch output 105. The switch 100 is adapted to forward a selected one of a plurality of input signals from the switch inputs 102-1, ..., 102-N to the switch output 105. In FIG. 1 the selected one of the coupled transmit signals 80-1, ..., 80-N at the switch inputs 102-1, ..., 102-N is forwarded to the switch output 105.

In FIG. 1 it is assumed that the coupled transmit signals 80-1, ..., 80-N substantially have an identical power level. Providing the coupled transmit signals 80-1, ..., 80-N of the substantially identical power level at the switch inputs 102-1, ..., 102-N yields the substantially identical power level of the selected one of the coupled transmit signals 80-1, ..., 80-N within the common feedback path 150 and hence the digital predistortion update module 22.

Figure 2:
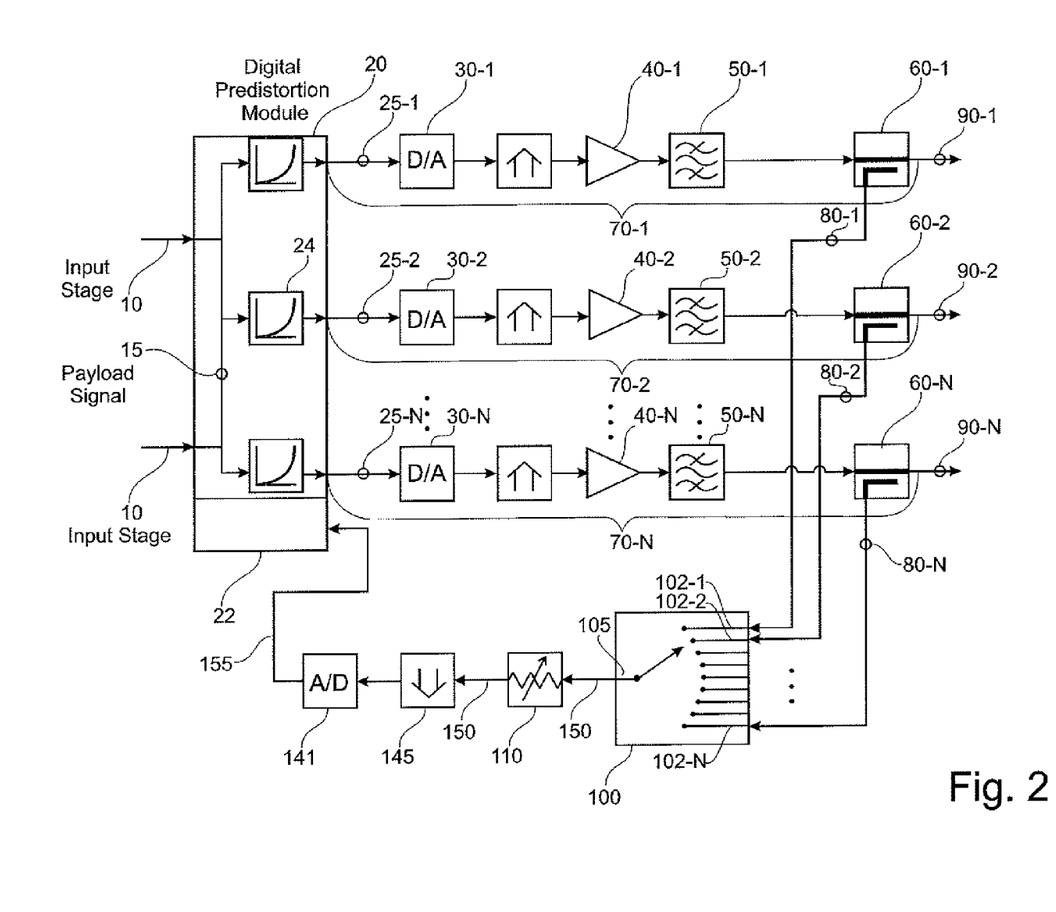
FIG. 2 shows a further aspect of the radio station according to the present disclosure.

In other words, the nonlinearities occurring within individual ones of the amplifiers 40-1, ..., 40-N will equally be represented within the selected one of the coupled transmit signals 80-1, ..., 80-N leaving the switch 100. If the power level of the coupled transmit signals 80-1, ..., 80-N is not substantially identical when arriving at the switch 100, it is possible to alter a product of a power rating of the amplifier 40-1, ..., 40-N and a coupling strength of the coupler 60-1, ..., 60-N. The altering of the product of the power rating of the amplifier 40-1, ..., 40-N and the coupling strength of the coupler 60-1, ..., 60-N may be achieved by a variable attenuator 110a as shown in FIG. 2.

For the situation depicted in FIG. 1 the product of the power ratings of the amplifiers 40-1, ..., 40-N and the coupling strength of the couplers 60-1, ..., 60-N is assumed to be identical for all the transmit paths 70-1, ..., 70-N.

The selected one of the coupled transmit signals 80-1, ..., 80-N is fed into a common feedback path 150 leading from the switch output 105 to a digital predistortion update module 22 of the digital predistortion module 20.

The provision of a single common feedback path 150 reduces complexity and hardware costs of the radio station 1. The common feedback path 150 comprises an attenuator 110. The attenuator 110 serves to reduce a power level of the selected one of the coupled transmit signals 80-1, ..., 80-N. The attenuator 110 may be useful to assure that the selected one of the coupled transmit signals 80-1, ..., 80-N does not exceed a power rating of the digital predistortion update module 22. It should be noted that the attenuator 110 should be of a substantially linear, more precisely flat, transfer characteristic over the frequency range of transmission of the radio station 1. The flat transfer characteristics of the attenuator 110 prevents further nonlinearities being introduced to the selected one of the coupled transmit signals 80-1, ..., 80-N stemming from the attenuator 110 and the amplifier 40-1, ..., 40-N.

The common feedback path 150 further comprises an analogue-to-digital converter 140. The analogue-to-digital converter 140 shown in FIG. 1 is a delta-sigma analogue-to-digital converter. Any other analogue-to-digital converter 140 may be used. It is convenient to place the analogue-to-digital converter 140 downstream of the attenuator 110. It would also be possible to place the analogue-to-digital converter 140 up stream from the attenuator 110. Placing the analogue-to-digital converter 140 downstream of the attenuator 110 allows provision of a defined power level of the selected one of the coupled transmit signals 80-1, ..., 80-N for all the transmit paths 70-1, ..., 70-N. The defined power level of the selected one of the coupled transmit signals 80-1, ..., 80-N may be of interest in order to use a full dynamic range of the analogue-to-digital converter 140, as is known in the art.

The digital predistortion update module 22 is adapted to update the digital predistortions 24-1, ..., 24-N imposed onto the payload signal 15 forming the predistorted payload signal 25-1, ..., 25. The digital predistortion update module 22 may be implemented using the DSP. The use of the common feedback path 150 reduces the complexity of the radio station 1. Individual feedback paths are no longer needed for each individual one of the transmit paths 70-1, ..., 70-N, i.e. for each individual one of the coupled transmit signals 80-1, ..., 80-N. Each one of the coupled transmit signals 80-1, ..., 80-N is a representation of the nonlinearities accumulated along an individual one of the transmit paths 70-1, ..., 70-N. The selected one of the coupled transmit signals 80-1, ..., 80-N represents one of the transmit paths 70-1, ..., 70-N.

It may be cheaper to provide only a single feedback path for all of the coupled transmit signals 80-1, ..., 80-N, rather than several feedback paths, i.e. one feedback path per coupled transmit signal. This all the more as bandwidth requirements are rather strict for a feedback path, which in turn requires the usage of relatively expensive high-grade equipment, such as cables, connectors etc. Moreover, only one of the digital predistortion update modules 22 is needed with the common feedback path 150, which will reduce complexity and hardware cost of the radio station 1 further according to the present disclosure.

There may be one or more DSPs used forming the digital predistortion module 20 and the digital predistortion update module 22. Alternatively, for cost saving reasons it may be of interest to implement the digital predistortion module 20 and the digital predistortion update module 22 on the same DSP, reducing the hardware complexity and costs of the radio station 1 further.

The digital predistortions 24-1, ..., 24-N may be represented as a number of lookup tables or a number of tables of polynomial coefficients describing the nonlinearities of the digital predistortions 24-1, ..., 24-N. The digital predistortion update module 22 is adapted to compare the selected one of the coupled transmit signals 80-1, ..., 80-N with the (delayed) payload signal 15. Subsequently, the digital predistortion update module 22 is adapted to extract the nonlinearities between a selected one of the coupled transmit signals 80-1, ..., 80-N and the payload signal 15 and to adjust a selected one of the digital predistortions 24-1, ..., 24-N, if necessary.

Therefore the digital predistortion module 20 is adapted to control a positioning of the switch 100. In other words the digital predistortion module 20 "knows" which one of the coupled transmit signals 80-1, . . . , 80-N is forwarded as the selected one of the transmit signals 80-1, . . . , 80-N to the digital predistortion update module 22. The predistortion update module 22 and/or the digital predistortion module 20 are further adapted to store samples of the selected ones of the transmit signals 80-1, . . . , 80-N in order to average over several samples of the selected one of transmit signals 80-1, . . . , 80-N.

FIG. 2 shows an alternative aspect of the radio station 1. The alternative aspect of the radio station 1 of FIG. 2 differs from FIG. 1 in that digital-to-analogue converters 31-1, 31-2, . . . , 31-N within FIG. 2 replace the delta-sigma digital-to-analogue converters 30-1, . . . , 30-N. The delta-sigma digital-to-analogue converters 30-1, . . . , 30-N shown in FIG. 1 do not require an up mixer 35-1, 35-2, . . . , 35-N as is needed with the digital-to-analogue converters 31-1, . . . , 31-N shown in FIG. 2. The up mixers 35-1, . . . , 35-N are known in the art and will not be discussed further within this disclosure. It will be apparent to a person skilled in the art that the use of the delta-sigma digital-to-analogue converters 30-1, . . . , 30-N is of interest in order to reduce the system complexity of the radio station 1; as the up mixers 35-1, . . . , 35-N are no longer needed.

A further difference of FIG. 2 is the presence of an analogue-to-digital converter 141 together with a down converter 145 replacing the delta-sigma analogue-to-digital converter 140 shown in FIG. 1. The presence of the delta-sigma analogue-to-digital converters 140 instead of the analogue-to-digital converter 141 and the down converter 145 is of interest in order to reduce the complexity of the radio station 1. Nevertheless, a person skilled in the art will appreciate that the delta-sigma analogue-to-digital converters 30-1, . . . , 30-N and the analogue-to-digital converters 31-1, . . . , 31-N in combination with the up converters 35-1, . . . , 35-N can be interchanged or used in combination. All remaining elements of FIG. 2 have already been discussed with respect to FIG. 1. Identical items are given identical reference numbers. The antenna elements 75-1, . . . , 75-N are not shown on FIG. 2.

FIG. 2 shows a further aspect of the radio station 1. In addition to the elements already discussed on FIG. 1, the radio station 1 comprises an attenuator 110 downstream of the switch 100. The attenuator 110 is actually implemented as an adjustable attenuator 110a in FIG. 2. Nevertheless the fixed attenuator 110 is also conceivable as shown in FIG. 1. The adjustable attenuator 110a is of interest when the transmit paths 70-1, . . . , 70-N have different power ratings. It is a fairly common situation for the transmit paths 70-1, . . . , 70-N and hence the antenna elements 75-1, . . . , 75-N terminating the transmit paths 70-1, . . . , 70-N to transmit radiation of different power ratings. The antenna elements 75-1, . . . , 75-N are typically arranged in horizontal rows and vertical columns.

FIG. 3 shows an example of an arrangement of eight antenna elements 75-1, . . . , 75-N in a two by four arrangement. In FIG. 3 there are two vertical columns A and B and four horizontal rows I to IV of the antenna elements 75-1, 75-2, 75-3, 75-4, 75-5, 75-6, 75-7 and 75-8. The antenna elements 75-1, . . . , 75-8 are depicted as rectangular and shall be construed as non-limiting examples. As is known to a person skilled in the art other geometries and/or types of the antenna elements 75-1, . . . , 75-N are conceivable. Examples for possible geometries and/or types are: circular, elliptical, micro-strips, dipoles and the like. The antenna elements 75-1, . . . , 75-N are typically decoupled from each other. The decoupling may be achieved by a geometrical decoupling, i.e. an overlap of individual ones of the antenna elements 75-1, . . . , 75-N. Alternatively or additionally the decoupling may be achieved by appropriate decoupling networks. The appropriate decoupling networks commonly comprise PIN diodes. The decoupling is known to a person skilled in the art and will not be explained any further. The decoupling is not shown with FIGS. 1, 2 and 3.

The central antenna elements 75-3, 75-4, 75-5 and 75-6 in FIG. 3 (i.e. in horizontal lines II and III) could transmit with a power rating of 10 Watts; whereas the outer antenna elements (i.e. horizontal lines I and IV) only transmit with a power rating of 4 Watts. The adjustable attenuator 110a (FIG. 3) is adapted to assure that the selected one of the coupled transmit signals 80-1, . . . , 80-N reaching the switch inputs 102-1, . . . , 102-N are of a substantially identical power rating for all of the transmit paths 70-1, . . . , 70-N.

The adjustable attenuator 110a is adapted to assure that the product of the power rating of the amplifier 40-1, . . . , 40-N and the coupling strength of the coupler 60-1, . . . , 60-N are made substantially identical. This may be of interest when the couplers 60-1, . . . , 60-N have different coupling strengths. The term "substantially identical power rating" shall be construed as referring to the substantially identical product of the power rating of the amplifiers 40-1, . . . , 40-N and the coupling strength of the couplers 60-1, . . . , 60-N, as defined above.

The substantially identical power rating would allow all of the coupled transmit signals 80-1, . . . , 80-N to be represented with substantially equal magnitude when forwarded as the selected one of the coupled transmit signals 80-1, . . . , 80-N. If the power rating of the transmit path 70-1 is four times higher than, for example, the power rating of the $N^{th}$-transmit path 70-N, the adjustable attenuator 110a downstream of the switch 100 would attenuate the coupled transmit signal 80-1 four times stronger than the coupled transmit signal 80-N when forwarded as the selected one of the transmit paths 80-1, . . . , 80-N. Such an attenuation according to the power rating of the transmit paths 70-1, . . . , 70-N yields the substantially identical power level across all the coupled feedback signals 80-1, . . . , 80-N at the switch output 105.

It will be appreciated by a person skilled in the art that the adjustable attenuators 110a shown in FIG. 2 may also be used in the aspect of the radio station 1 shown in FIG. 1.

According to the prior art the linearising of the transfer characteristics is achieved in a sequential order of the transmit paths 70-1, . . . , 70-N. Hence all the transmit paths 70-1, . . . , 70-N are treated equally, irrespective of their position in a hierarchy of the transmit paths 70-1, . . . , 70-N.

The power rating of the transmit paths 70-1, . . . , 70-N may serve as a basis for the hierarchy of the transmit paths 70-1, . . . , 70-N. The transmit paths 70-1, . . . , 70-N with the highest power rating will have most impact on a power of transmission of the radio station 1, as shall be explained further down. Alternative hierarchy criteria are conceivable, based for example, on the geometrical position of the antenna element 75-1, . . . , 75-N within an antenna array 5000, as displayed within FIG. 3.

The switch 100 can be switched to the transmit path 70-1, . . . , 70-N with the highest power rating more often than to the other transmit paths 70-1, . . . , 70-N. Typically several samples of the selected one of the coupled transmit signals 80-1, . . . , 80-N will be averaged in order to update the digital predistortion 24-1, . . . , 24-N to be imposed onto the payload signal 15. The switching of the switch 100 will be controlled by the digital predistortion module 20 and/or the digital predistortion update module 22.

The disclosure further relates to a method for digitally predistorting a payload signal 15 to linearise a transfer characteristic of the transmit paths 70-1, . . . , 70-N according to a hierarchy of the transmit paths 70-1, . . . , 70-N.

Figure 4:
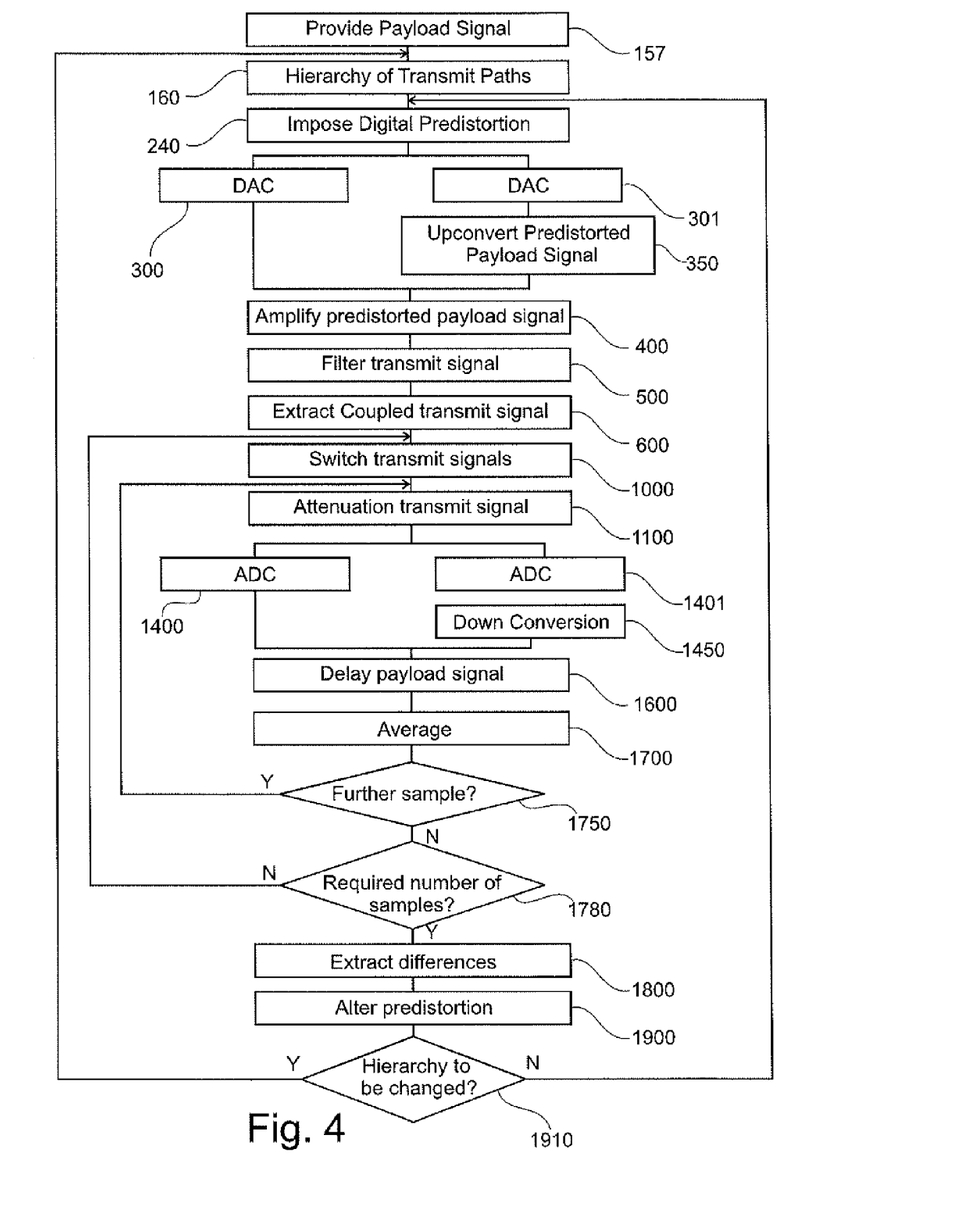
FIG. 4 shows a method for digitally predistorting a payload signal according to the present disclosure.

FIG. 4 shows a flow diagram of the method for digitally predistorting the payload signal 15. A step 157 comprises providing the payload signal 15 at an input interface 10. A common way of representing the payload signal 15 is in pairs of the in-phase portions and the quadrature portions (I,Q). Typically, the input interface 10 is adapted to accept the payload signal 15 in the (I,Q) format. It is conceivable for the payload signal 15 to be represented at the input interface 10 in any other suitable format.

A step 160 comprises providing a hierarchy of the transmit paths 70-1, ..., 70-N. The hierarchy shall be construed as the order of the ranking of the transmit paths 70-1, ..., 70-N according to the hierarchy criterion. One or more of the transmit paths 70-1, ..., 70-N may be ranked identically within the hierarchy of the transmit paths 70-1, ..., 70-N.

The transmit paths 70-1, ..., 70-N may be rated according to the power rating of the transmit paths 70-1, ..., 70-N. In this case the hierarchy criterion of the transmit paths 70-1, ..., 70-N is the power rating of the transmit paths 70-1, ..., 70-N.

The power rating of the transmit paths 70-1, ..., 70-N shall be explained with respect to the power rating of the transmit paths 70-1, ..., 70-8 as shown in FIG. 3. The central antenna elements 75-3, 75-4, 75-5 and 75-6 (in horizontal lines II and III) transmit with the power rating of 10 Watts; the outer antenna elements 75-1, 75-2, 75-7 and 75-8 transmit with a power rating of only 4 Watts. Within the hierarchy of the transmit paths 70-1, ..., 70-8 of FIG. 3 the central transmit paths 70-3, 70-4, 70-5 and 70-6 would be ranked evenly and 1.5 times higher than the transmit paths 70-1, 70-2 and 70-7 and 70-8, if the transmit paths 70-1, ..., 70-N are to be ranked accordingly to the transmit power rating.

Alternatively or additionally the transmit paths 70-1, ..., 70-N may be ranked according to an importance of the transmit paths 70-1, ..., 70-N within a beam pattern radiated by the radio station 1. Several other hierarchy models are conceivable.

From the state of the art only an equal transmit path hierarchy is known for all the transmit paths 70-1, ..., 70-N with a sequential switching of the switch 100. The switch 100 is switched from one of the switch inputs 102-1, ..., 102-N to the next in a sequential switching. This means the switch 100 is switched from one of the switch inputs 102-1, ..., 102-N. If the highest switch input 102-N is reached the switch returns to the first switch input 102-1 and vice versa.

Alternatively or additionally the hierarchy of the transmit paths 70-1, ..., 70-N may be randomized. This would mean that all the transmit paths 70-1, ..., 70-N have the same position within the hierarchy of the transmit paths 70-1, ..., 70-N. For the randomized hierarchy the switching of the switch 100 is no longer sequential as with the prior art but randomized. The randomized hierarchy of the transmit paths 70-1, ..., 70-N may be of interest once the digital predistortions 25-1, ..., 25-N have been successfully updated for all the transmit paths 70-1, ..., 70-N. The use of a random switch hierarchy ensures that one part of the array (for example, the top) does not drift out of predistortion calibration whilst the switch is sequencing through a different part of the array (for example, the bottom).

The hierarchy of the transmit paths 70-1, ..., 70-N provided in the step 160 does not only comprise the ordering of the transmit paths 70-1, ..., 70-N according to the hierarchy criterion. The hierarchy of the transmit path 70-1, ..., 70-N further provides an order of switching the switch 100 to another one of the transmit paths 70-1, ..., 70-N as a subsequent selected one of the transmit paths 70-1, ..., 70-N as well as an averaging scheme, as will be explained next.

The selected one of the coupled transmit signals 80-1, ..., 80-N contains a representation of the nonlinearities of the selected transmit path 70-1, ..., 70-N. It may be of interest to immediately average over samples of the selected one of the coupled transmit signals 80-1, ..., 80-N before switching the switch 100 to the subsequent selected one of the coupled transmit signals 80-1, ..., 80-N. An immediate averaging over the samples of the selected one of the coupled transmit signals 80-1, ..., 80-N may be of interest when the selected one of the transmit paths 70-1, ..., 70-N is of high rank according to the hierarchy criterion; for example for the selected one of the transmit paths 70-1, ..., 70-N having the highest power rating.

Alternatively the averaging scheme may be a parallel averaging over different ones of the coupled transmit signals 80-1, ..., 80-N. The parallel averaging is of interest when the ranking of the transmit paths 70-1, ..., 70-N is substantially equal for all the transmit paths 70-1, ..., 70-N. This is for example the case when all the transmit paths 70-1, ..., 70-N are of the substantially identical power rating. The switching may happen in a sequential or randomized order.

Therefore it is necessary for the hierarchy of the transmit paths 70-1, ..., 70-N to comprise the order of switching as well as the averaging scheme.

It is further conceivable to change the hierarchy of the transmission paths 70-1, ..., 70-N during the operation of the radio station 1. For example the switching scheme may be changed to the randomized switching once all of the transmit paths 70-1, ..., 70-N have been successfully linearised. The change to randomized switching may be of interest to identify a drifting one of the transmit paths 70-1, ..., 70-N. The drifting one of the transmit paths 70-1, ..., 70-N shall be construed as the transfer characteristics of the drifting one of the transmit paths 70-1, ..., 70-N no longer being linear or changing its amount of nonlinearity. Appropriate thresholds for the selected one of the transmit paths 70-1, ..., 70-N to be considered for the drifting one of the transmit paths 70-1, ..., 70-N may be defined for a step 1900 or a step 1910 of the method. Note that the ranking order can change during the operation of the base-station. For example if the transmit beam is steered to a new direction, then the transmitter(s) which are required to transmit the highest power levels may well be different from those which transmitted the highest power levels in the previous beam position. The hierarchy can therefore be changed accordingly.

A step 240 comprises imposing at least one digital predistortion 24-1, ..., 24-N onto the payload signal 15 forming the predistorted payload signal 25-1, ..., 25-N. The payload signal 15 is the intended signal to be relayed as the transmit signal 90-1, ..., 90-N along the transmit paths 70-1 ... 70-N. The predistorted transmit signal 25-1, ..., 25-N is forwarded along the transmit paths 70-1, ..., 70-N, in order to linearise the transfer characteristics of the transmit paths 70-1, ..., 70-N when amplified by the amplifier 40, as explained above. The imposing 240 of the digital predistortion 24-1, ..., 24-N comprises adding and/or multiplying "the inverse distortion" to the payload signal 15. By imposing the correct digital predistortion 24-1, ..., 24-N onto the payload signal 15, the transmit signal 90-1, ..., 90-N is a correct representation of the transmit signal 15. A most recent one of the digital predistortions 24-1, ..., 24-N used previously could be used as an initial value for the digital predistortions 24-1, ..., 24-N forming the predistorted payload signal 25-1, ..., 25-N. Alternatively and/or additionally an "inversion" of an estimated nonlinearity of the amplifiers 40-1, ..., 40-N could be used as the initial value for the imposing of the digital predistortion 24. The initial value of the digital predistortions

24-1, . . . , 24-N may further comprise not applying any digital predistortion for the initial value of the digital predistortion 24-1, . . . , 24-N.

A digital-to-analogue conversion of the predistorted payload signal 25-1, . . . , 25-N follows the step 240 of imposing the digital predistortions 24-1, . . . , 24-N onto the payload signal 15. In the left branch of the FIG. 4, a step 300 of digital-to analogue conversion comprises using the delta-sigma digital to analogue converters 30-1, . . . , 30-N.

The right branch of the diagram comprises a step 301 of digital-to-analogue conversion of the predistorted payload signal 25-1, . . . , 25-N using the digital-to-analogue converter 31-1, . . . , 31-N. The step 301 is followed by a step 350 of upconverting the predistorted payload signal 25-1, . . . , 25-N.

The method further comprises a step 400 of amplifying the predistorted payload signal 25-1, . . . , 25-N yielding the transmit signal 90-1, . . . , 90-N irrespective of the selected way of digital-to-analoguely converting.

A step 500 of filtering the transmit signal 90-1, . . . , 90-N is carried out. The step 500 of filtering may comprise the use of band pass filters. The band pass filter may comprise a filtering characteristic as defined by the communication protocol.

An extraction step 600 of extracting comprises the extraction of a coupled transmit signal 80-1, . . . , 80-N out of the transmit signal 90-1, . . . , 90-N.

A switching step 1000 comprises switching the selected one of the coupled transmit signals 80-1, . . . , 80-N into the common feedback path 150. The switching step 1000 may be carried out using a switch 100. The switching step 1000 may be determined by the hierarchy of the transmit paths 70-1, . . . , 70-N provided in the step 160, as described above. The hierarchy of the transmit paths 70-1, . . . , 70-N being forwarded as the selected one of the transmit paths 70-1, . . . , 70-N is determined by the order of the transmit paths 70-1, . . . , 70-N within the hierarchy of the transmit paths 70-1, . . . , 70-N.

In an attenuation step 1100 an optional attenuating of the selected one of the coupled transmit signals 80-1, . . . , 80-N may be achieved. The optional attenuation step 1100 may be of interest in order to adapt a power level of the selected one of the coupled transmit signals 80-1, . . . , 80-N to a power level accepted by the digital predistortion update module 22. The step 1100 of optionally attenuating may likewise be carried out using the fixed attenuator 110 or the adjustable attenuator 110a.

The selected one of the coupled transmit signals 80-1, . . . , 80-N is digitized, following the optional attenuation step 1100. Depending on the digitizers used the method branches into two alternatives, as shown in the FIG. 4.

On the left side a DAC step 1400 of analogue-to-digital conversion or digitizing is carried out by the delta-sigma analogue-to-digital converter 141 (as shown in FIG. 1). On the right side of the diagram a DAC step 1401 of analogue-to-digital conversion is carried out using the analogue-to-digital converter 140. Subsequently, the DAC step 1401 is followed by a down conversion step 1450 of down converting the common feedback signal 155, as is known in the art.

The use of the delta-sigma converters reduces the complexity of the radio system 1. The down converter 120 is no longer necessary when the delta-sigma converter 140 replaces the analogue-to-digital converter 141. Consequently, the down converting 1450 is no longer needed, as shown in the left branch of FIG. 4.

The method is followed by an optional delay step 1600 of delaying the payload signal 15. A delay is to be chosen in order to compensate for the travelling time of the payload signal 15 as the predistorted payload signal 25-1, . . . , 25-N to the amplifier 40-1, . . . , 40-N and as the transmit signal 90-1, . . . , 90-N along the transmit path 70-1 . . . 70-N and from the coupler 60-1 . . . 60-N as the coupled transmit signal 80-1, . . . , 80-N to the switch 100 and further as the selected one of the coupled transmit signals 80-1, . . . , 80-N to the digital predistortion update module 22.

The method further comprises an optional averaging step 1700. The optional averaging step comprises an averaging of the selected ones of the coupled transmit signals 80-1, . . . , 80-N over several samples. As described above the averaging may be the sequential averaging or the parallel averaging. The parallel averaging and the sequential averaging both comprise storing individual ones of the samples to be averaged.

A step 1750 comprises checking whether a further sample for the selected one of the coupled transmit signals 80-1, . . . , 80-N is to be taken next. If this is the case, for example with the sequential averaging, the method returns in the Y branch prior to step 1100.

If there is no sample to be taken next from the selected one of the coupled transmit signals 80-1, . . . , 80-N, the method continues with the N branch and reaches a step 1780.

The step 1780 comprises assessing whether a required number of samples for the selected one of the coupled transmit signals 80-1, . . . , 80-N has been reached. If the required number of samples for the selected one has been reached the method continues along the Y branch. If the answer to the question in step 1780 is "no", the method continues along the N branch, returning just before the step 1000 of switching the switch 100.

If the required number of samples for the selected one of the transmit paths 70-1, . . . , 70-N is reached the method continues with a step 1800.

The extraction step 1800 comprises an extracting of differences between the selected one of the coupled transmit signals 80-1, . . . , 80-N and the, possibly delayed, payload signal 15. The extraction step 1800 yields the differences mainly introduced due to the nonlinearities of the amplifier 40-1, . . . , 40-N. The differences may comprise a difference in amplitude and/or phase between the (delayed) payload signal 15 and the selected one of the coupled transmit signals 80-1, . . . , 80-N. Methods and devices for extracting the differences between two signals are known in the art and shall not be further explained here.

With the extracted difference from the extraction step 1800 an altering step 1900 of altering the digital predistortion 24-1, . . . , 24-N is carried out in order to linearise the transfer characteristics of the transmit paths 70-1, . . . , 70-N pertaining to the selected one of the coupled transmit signals 80-1, . . . , 80-N.

The method further comprises a step 1910. The step 1910 identifies whether the hierarchy of the transmit paths 70-1, . . . , 70-N is to be changed, as has been explained further above. If the hierarchy of the transmit paths 70-1, . . . , 70-N is to be changed the method returns just before the step 160 of providing the hierarchy of the transmit paths 70-1, . . . , 70-N and the changed hierarchy is provided. In the subsequent step 240 of imposing the digital predistortions 24-1, . . . , 24-N the altered predistortions identified within the step 1900 shall be used.

If the hierarchy of the transmit paths 70-1, . . . , 70-N is not to be changed, the method returns to a position just before the step 240 and the altered digital predistortions 24-1, . . . , 24-N are to be imposed.

The digital predistortions 24-1, . . . , 24-N are, for example, represented as several look up tables comprising coefficients representing the shape of the digital predistortions 24-1, . . . ,

24-N. Methods for representing the nonlinearity in terms of the coefficients, such as for example polynomial coefficients are known to a person skilled in the art and shall hence not be explained any further.

The disclosure further relates to a computer program product embedded on a computer readable medium. The computer program product comprises executable instructions for the manufacture of the radio station 1 according to the present invention.

The disclosure relates to yet another computer program product. The yet another computer program product comprises instructions to enable a processor to carry out the method for digitally predistorting a payload signal 15 according to the invention.

The present disclosure further relates to an antenna array 5000 comprising a radio station 1 according to the present disclosure and a signal conditioner 501. The antenna array 5000 is adapted to perform anyone out of beam forming, beam tilting, been diversities and direction of arrival and the like.

FIG. 5 shows the antenna array 5000 comprising the plurality of antenna elements 75-1 . . . 75-N terminating the transmit paths 70-1 . . . 70-N of the radio station 1 according to the present invention. In FIG. 5 the radio station 1 is depicted only with items of relevance for the understanding of the antenna array 5000. The antenna array 5000 further comprises a signal conditioner 501. The signal conditioner 501 is adapted to impose phase and magnitude differences 800 between the antenna elements 75-1 . . . 75-N. The phase and magnitude differences 800 comprise a transmit phase and magnitude difference 800T accumulated along the transmit paths 70-1 . . . 70-N. The phase and magnitude differences 800 may further comprise a receive phase and magnitude difference 800R accumulated along at least one receive path 510 1, . . . , 510-N. In FIG. 5 only three receive paths 510-1, . . . , 510-N are shown. The signal conditioner 501 may be implemented as a DSP. It is further possible for the signal conditioner 501 to comprise the DSP of the radio station 1. The signal conditioner 501 may be adapted to derive the transmit magnitude and phase deviations 800T accumulated along the transmit paths 70-1, . . . , 70-N of the radio station 1 according to the invention.

The signal conditioner 501 is adapted to impose phase and magnitude differences onto at least two of the transmit paths 510-1, . . . , 510-N. A reception of the antenna array 5000 substantially comprises a defined phase and magnitude relation between at least one pair of the receive signals.

It is to be understood that the antenna array 5000 comprising the radio station 1 and the signal conditioner 501 may as well be used to calibrate the transmit paths 70-1, . . . , 70-N of the radio station 1. It is of interest to complete the method of digitally predistorting a payload signal 15 prior to a calibration of the transmit paths 70-1, . . . , 70-N. The nonlinearities of the transmit paths 70-1, . . . , 70-N would render the calibration of the transmit paths 70-1, . . . , 70-N unreliable, if the method of digitally predistorting a payload signal 15 was not completed prior to calibration of the transmit paths 70-1, . . . , 70-N.

The calibration of the transmit paths 70-1, . . . , 70-N is to be carried out for a chosen one of the transmit paths 70-1, . . . , 70-N at a time. The calibration of the chosen one of the transmit paths 70-1, . . . , 70-N requires a feedback signal to travel along the chosen one of the transmit paths 70-1, . . . , 70-N. The feedback signal to travel along the chosen one of the transmit paths 70-1, . . . , 70-N is necessary in order to allow for the transmit phase and magnitude difference 800T of the chosen one of the transmit paths 70-1, . . . , 70-N to be accumulated. The coupled transmit signals 80-1, . . . , 80-N have traveled along individual ones of the transmit paths 70-1, . . . , 70-N.

The common feedback path 155 is suitable for feeding the coupled transmit signals 80-1, . . . , 80-N back to the signal conditioner 501. As mentioned before the DSP used with the digital predistortion module 20 and the DSP used in connection with the signal conditioner 501 may be implemented on a single DSP. If the DSP used in connection with the signal conditioner 501 and the predistortion module 20 are different, appropriate communication means between both entities, i.e. DSPs are provided, in order to render the signal conditioner 501 adapted to deduce the transmit phase and magnitude difference 800T. Hence the feedback of the coupled transmit signals 80-1, . . . , 80-N to the digital predistortion update module 22, as provided by the common feedback path 155, may be sufficient for the signal conditioner 501 to extract the transmit phase and magnitude difference 800T accumulated along the chosen one of the transmit paths 70-1, . . . , 70-N.

As is known in the art the payload signal 15 may be used as a feedback signal when extracting the transmit phase and magnitude difference 800T. Alternatively a dedicated calibration signal may be injected into the payload signal 15 and identified using correlation techniques in order to extract the transmit phase and magnitude difference 800T for the dedicated calibration signal.

As stated before the signal conditioner 501 is further adapted to impose a phase and magnitude change on at least two of the transmit paths 70-1, . . . , 70-N. The phase and magnitude change imposed can be selected such that the transmission of the antenna array 5000 substantially comprises a defined phase and magnitude relation between at least one pair of the antenna elements 75-1, . . . , 75-N. The defined phase and magnitude relation can be such that the magnitude and phase relation is defined for all the transmit paths 70-1, . . . , 70-N. In other words, the signal conditioner 501 is adapted to make the transmission of the antenna array 5000 of a defined phase and magnitude relation in response to the transmit phase and magnitude differences 800T deduced by the signal conditioner 501. To achieve a defined phase and magnitude relation is equivalent to calibrating the transmit paths 70-1, . . . , 70-N.

The defined phase and magnitude relation may be such that the transmission of the antenna array 5000 is coherent. For a coherent transmission the phase and magnitude changes imposed would just compensate the transmit phase and magnitude differences 800T. Alternatively or additionally the phase and magnitude changes may be chosen to provide a desired beam forming pattern.

The antenna array 5000 comprising the base station 1 according to the present disclosure allows for the dimensions of the antenna array 5000 to define the global dimensions of the radio station 1. The present disclosure allows for the radio station 1 to be implemented on a chip, wherein the overall dimensions of the antenna array 5000 as well as the overall dimensions of the radio station 1 are substantially governed by the dimensions of the antenna array 5000, i.e. all the antenna elements 75-1, . . . , 75-N of the antenna array 5000.

While various embodiments of the present invention have been described above, it should be understood that they have been presented by way of example, and not limitation. It will be apparent to persons skilled in the relevant arts that various changes in form and detail can be made therein without departing from the scope of the invention. In addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modelling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). The software can also be disposed as a computer data signal embodied in a computer usable (e.g., readable) transmission medium (e.g., carrier wave or any other medium including digital, optical, or analogue-based medium). Embodiments of the present invention may include methods of providing the apparatus described herein by providing software describing the apparatus and subsequently transmitting the software as a computer data signal over a communication network including the Internet and intranets.

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. A radio station comprising:
   a digital predistortion module adapted to impose at least one digital predistortion an a payload signal thus farthing at least one predistorted payload signal,
   at least two transmit paths adapted to relay the at least one predistorted payload signal,
   an RF amplifier within the at least two transmit paths adapted to amplify the at least one predistorted payload signal, thus farming at least two transmit signals to be relayed along the at least two transmit paths,
   an antenna element terminating the at least two transmit paths,
   a coupler adapted to extract at least one coupled transmit signal out of the at least two transmit signals,
   a switch adapted to forward a selected one of the coupled transmit signals into a common feedback path,
   the common feedback path being adapted to feed the selected one of the coupled transmit signals to a digital predistortion update module adapted to update at least one of the digital predistortions;
   the predistortion module being further adapted to control a positioning of said switch according to a hierarchy criterion of the transmit paths thus linearising a transfer characteristic of at least two of the transmit paths according to a hierarchy of the transmit paths wherein at least two transmit paths have different rankings based on the hierarchy criterion.

2. The radio station according to claim 1, wherein the hierarchy of the transmit paths is given by a geometrical arrangement of the antenna elements.

3. The radio station according to claim 1, wherein the hierarchy of the transmit paths is given by a distribution of a power rating of the transmit paths.

4. The radio station according to claim 1 wherein the hierarchy of the transmit paths is given by a statistical weight of the antenna elements within a beam transmitted by the radio station.

5. The radio station according to claim 1, wherein the predistortion module 1 comprises a digital signal processor.

6. The radio station according to claim 1, further comprising an input stage adapted to accept the payload signal.

7. The radio station according to claim 1, wherein the at least one transmit path comprises a digital-to-analogue converter.

8. The radio station according to claim 7, wherein the digital-to-analogue converter comprises a delta-sigma digital-to-analogue converter.

9. The radio station according to claim 1, wherein the at least one transmit path further comprises a band pass filter.

10. The radio station according to claim 1, wherein the common feedback path comprises an attenuator.

11. The radio station according to claim 10 wherein the attenuator comprises an adjustable attenuator.

12. The radio station according to claim 1, wherein the common feedback path further comprises an analog-to-digital converter adapted to digitize the selected one of the coupled transmit signals.

13. The radio station according to claim 12, wherein the analogue-to-digital converter comprises a delta-sigma analogue-to-digital converter.

14. A method for digitally predistorting a payload signal, the control logic comprising:
   providing the payload signal,
   providing a hierarchy of transmit paths,
   imposing at least one digital predistortion on the payload signal thus forming at least one predistorted payload signal to be relayed as at least two transmit signals along at least two transmit paths;
   extracting at least one coupled transmit signal out of the at least two transmit signals;
   switching to a selected one of the coupled transmit signals thus feeding the selected one of the coupled transmit signal to a digital predistortion update module;
   altering the at least one digital predistortion using the selected one of the coupled transmit signals; and
   whereby switching to a selected one to the coupled transmit signals is provided in the order of a hierarchy criterion of the transmit paths thereby linearising a transfer characteristics of at least two of the transmit paths according to the hierarchy of the transmit paths, wherein at least two transmit paths have different rankings based on the hierarchy criterion.

15. The method according to claim 14, further comprising: digital-to-analogue converting the transmit signal.

16. The method according to claim 15, wherein the converting comprises:
   digital-to-analogue converting using a delta-sigma converter.

17. The method according to claim 15, wherein the converting further comprises:
   digital-to analogue converting using an analogue-to-digital converter,
   upconverting the transmit signal.

18. The method according to claim 14, further comprising: amplifying the transmit signal.

19. The method according to claim 14, further comprising: filtering the transmit signal.

20. The method according to claim 14, further comprising: attenuating the selected one of the coupled transmit signals.

21. The method according to claim 20, wherein the attenuating comprises using a variable attenuator.

22. The method according to claim 14, further comprising: digitizing the selected one of the coupled transmit signals.

23. The method according to claim 14, wherein the method further comprises:
optional delaying the payload signal,
optional averaging the selected one of the transmit signals.

24. The method according to claim 14, the method further comprising:
averaging the selected one of the coupled transmit signal,
extracting of differences between the selected one of the coupled transmit signals and the optionally delayed, payload signal.

25. A computer program product embodied on a non-transitory computer-readable medium and comprising executable instructions for the manufacture of the radio station
a digital predistortion module adapted to impose at least one digital predistortion on a payload signal thus forming at least one predistorted payload signal,
at least two transmit paths adapted to relay the at least one predistorted payload signal,
an RF amplifier within the at least two transmit paths adapted to amplify the at least one predistorted payload signal, thus forming at least two transmit signals to be relayed along the at least two transmit path.
an antenna element terminating the at least two transmit paths.
a coupler adapted to extract at least one coupled transmit signal out of the at least two transmit signals,
a switch adapted to forward a selected one of the coupled transmit signals into a common feedback path,
the common feedback path being adapted to feed the selected one of the coupled transmit signals to a digital predistortion update module adapted to update at least one of the digital predistortions;
whereby switching to a selected one to the coupled transmit signals is provided in the order of a hierarchy criterion of the transmit paths thus linearising a transfer characteristic of at least two of the transmit paths according to a hierarchy of the transmit paths, wherein at least two transmit paths have different rankings based on the hierarchy criterion.

26. Computer program product comprising a computer usable non-transitory medium having control logic stored therein, the control logic comprising:
first computer readable control means for providing the payload signal,
second computer readable control means for providing a hierarchy of transmit paths,
third computer readable control means for imposing at least one digital predistortion on the payload signal thus forming at least one predistorted payload signal to be relayed as at least two transmit signals along at least two transmit paths,
fourth computer readable control means for extracting at least one coupled transmit signal out of the at least two transmit signals,
fifth computer readable control means for switching to a selected one of the coupled transmit signals, thus feeding the selected one of the coupled transmit signal to a digital predistortion update module,
sixth computer readable control means for altering the at least one digital predistortion using the selected one of the coupled transmit signals;
whereby switching to a selected one to the coupled transmit signals is provided in the order of a hierarchy criterion of the transmit paths thereby linearising, a transfer characteristics of at least two of the transmit paths according to the hierarchy of the transmit paths, wherein at least two transmit oaths have different rankings based an the hierarchy criterion.

27. An array comprising:
a radio station comprising,
a digital predistortion module adapted to impose at least one digital predistortion on a payload signal thus forming at least one predistorted payload signal,
at least two transmit paths adapted to relay the at least one predistorted payload signal,
an RF amplifier within the at least two transmit paths adapted to amplify the at least one predistorted payload signal, thus forming at least two transmit signals to be relayed along the at least two transmit paths,
an antenna element terminating the at least two transmit paths,
a coupler adapted to extract at least one coupled transmit signal out of the at least two transmit signals,
a switch adapted to forward a selected one of the coupled transmit signals into a common feedback path,
the common feedback path being adapted to feed the selected one of the coupled transmit signals to a digital predistortion update module adapted to update at least one of the digital predistortions;
the predistortion module further adapted to control a positioning of said switch according to a hierarchy criterion of the transmit paths thus linearising a transfer characteristic of at least two of the transmit paths according to a hierarchy of the transmit paths, wherein at least two transmit paths have different rankings based on the hierarchy criterion:
the antenna element comprising an adjustable phase and magnitude between individual ones of the antenna elements;
a signal conditioner adapted to impose phase and magnitude differences between the antenna elements.

28. The array according to claim 27, further comprising at least one receive path terminated by the antenna, wherein the at least one receive path is adapted to receive a receive signal.

29. The array according to claim 27, wherein the phase and magnitude difference comprises a transmit phase and magnitude difference accumulated along the at least one transmit path for at least one of the at least one transmit paths.

30. The array according to claim 27, wherein the phase and magnitude difference comprises a receive phase and magnitude difference accumulated along the at least one receive path for at least one of the at least one receive paths.

31. The array according to claim 27, wherein the signal conditioner comprises a digital signal processor.

32. The array according to claim 27, wherein the signal conditioner comprises the digital signal processor of the radio station.

33. The array according to claim 27, wherein the signal conditioner is further adapted to derive the transmit magnitude and phase deviations.

34. The array according to claim 27, wherein the signal conditioner is further adapted to derive the receive magnitude and phase deviation.

35. The array according to claim 27, wherein the signal conditioner is adapted to impose phase and magnitude changes on at least two of the transmit paths, such that the transmission of the antenna array substantially comprises a defined phase and magnitude relation between at least one pair of the antenna elements.

36. The array according to claim 27, wherein the signal conditioner is adapted to impose phase and magnitude changes on at least two of the of the at least one receive paths, such that the reception of the antenna array substantially comprises a defined phase and magnitude relation between at least one pair of the receive signals.

37. The array according to claim 27, wherein the transmission of the antenna array is substantially coherent between at least one pair of the antenna elements.

38. The array according to claim 27, wherein the antenna array is adapted to provide at least one of beam forming, down tilting, beam diversity and direction of arrival detection.

39. A chipset comprising:
a digital predistortion module adapted to impose at least one digital predistortion on a payload signal thus forming at least one predistorted payload signal,
at least two transmit paths adapted to relay the at least one predistorted payload signal,
an RF amplifier within the at least two transmit paths adapted to amplify the at least one predistorted payload signal, thus forming at least two transmit signals to be relayed along the at least two transmit paths,
an antenna element terminating the at least two transmit paths,
a coupler adapted to extract at least one coupled transmit signal out of the at least two transmit signals,
a switch adapted to forward a selected one of the coupled transmit signals into a common feedback path,
the common feedback path being adapted to feed the selected one of the coupled transmit signals to a digital predistortion update module adapted to update at least one of the digital predistortions; the predistortion module further adapted to control a positioning of said switch according to a hierarchy criterion of the transmit paths thus linearising a transfer characteristic of at least two of the transmit paths according to a hierarchy of the transmit paths, wherein at least two transmit paths have different rankings based on the hierarch criterion.

* * * * *

UNITED STATES PATENT AND TRADEMARK OFFICE
CERTIFICATE OF CORRECTION

PATENT NO.        : 8,462,881 B2                                    Page 1 of 1
APPLICATION NO.   : 12/648028
DATED             : June 11, 2013
INVENTOR(S)       : Dirk Neumann et al.

It is certified that error appears in the above-identified patent and that said Letters Patent is hereby corrected as shown below:

In the Claims

Col. 17, Claim 1, line 37, "one digital predistortion an a payload signal thus farthing"

should read -- one digital predistortion on a payload signal thus forming --;

Col. 17, Claim 1, line 43, "signal, thus farming at least"

should read -- signal, thus forming at least --;

Col. 19, Claim 25, line 26, "at least two transmit path."

should read -- at least two transmit paths, --;

Col. 20, Claim 26, line 4, "oaths have different rankings based an the hierarchy criterion."

should read -- paths have different rankings based on the hierarchy criterion. --;

Col. 22, Claim 39, line 18, "based on the hierarch criterion."

should read -- based on the hierarchy criterion. --.

Signed and Sealed this
First Day of October, 2013

Teresa Stanek Rea
*Deputy Director of the United States Patent and Trademark Office*